United States Patent [19]

Ikehata et al.

[11] Patent Number: 4,622,592
[45] Date of Patent: Nov. 11, 1986

[54] COMPOSITE FACSIMILE APPARATUS

[75] Inventors: Norimitsu Ikehata, Hino; Kiyoshi Kobayashi, Tokyo; Hisashi Maeda, Hino, all of Japan

[73] Assignee: Kabushiki Kaisha Toshiba, Japan

[21] Appl. No.: 604,515

[22] Filed: Apr. 27, 1984

[30] Foreign Application Priority Data

Apr. 29, 1983 [JP] Japan .................................. 58-76474

[51] Int. Cl.$^4$ .............................................. H04N 1/32
[52] U.S. Cl. .................................... 358/257; 379/100; 379/355; 358/280
[58] Field of Search ...................... 358/256, 257, 280; 179/90 AD, 90 BD

[56] References Cited

U.S. PATENT DOCUMENTS 4,086,443  4/1978  Gorham et al. ............... 179/90 BD
4,406,925  9/1983  Jordan et al. .................. 179/90 BD

FOREIGN PATENT DOCUMENTS 2334867  4/1974  Fed. Rep. of Germany .
2951759  7/1980  Fed. Rep. of Germany .

Primary Examiner—James J. Groody
Assistant Examiner—Edward L. Coles
Attorney, Agent, or Firm—Finnegan, Henderson, Farabow, Garrett & Dunner

[57] ABSTRACT

A dial information character code which designates an address of a remote facsimile apparatus is included in an input character code and the input code or a picture signal corresponding thereto is sent to an addressed remote facsimile apparatus corresponding to the dial information character code.

7 Claims, 8 Drawing Figures

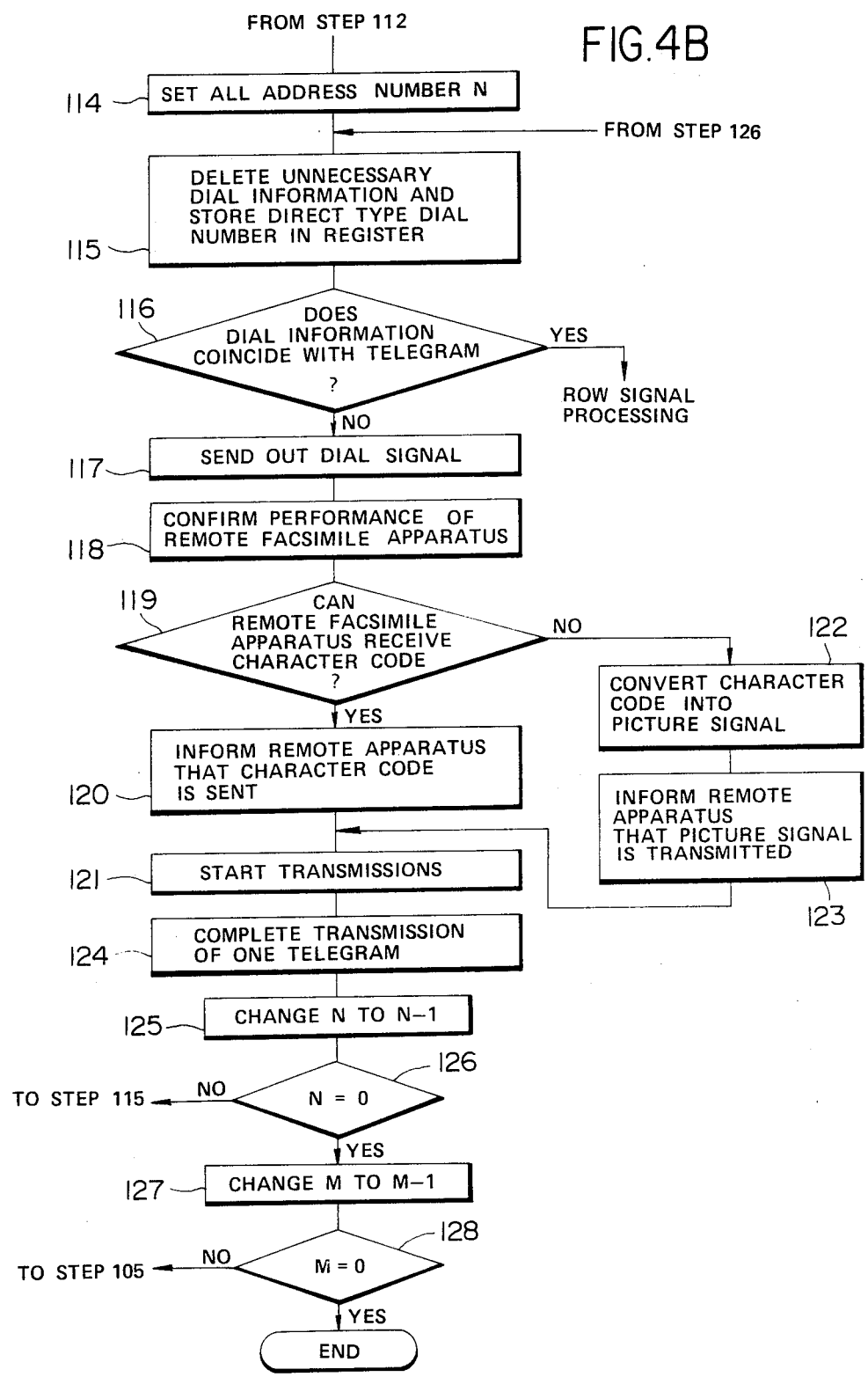

COMPOSITE FACSIMILE APPARATUS

BACKGROUND OF THE INVENTION

1. Field of Invention

This invention relates to a composite facsimile apparatus, and more particularly to a facsimile apparatus having improved address selection performance.

2. Description of the Prior Art

A composite facsimile apparatus is connected to a data terminal device, for example a word processor (hereinafter the term word processor represents a data terminal device). The word processor processes character codes for a telegram outputted from the word processor, outputs the character codes as they are receiver or after converting them into picture signals through circuits. In such composite facsimile apparatus, the word processor has sentence compiling capability and an accumulation capability, but it lacks the capability for transmittal the same composition to different receivers by merely changing their addresses.

According to a prior art composite facsimile apparatus, each time the address changes, it is necessary to input different dialing information, which is either the telephone number itself or an abbreviated ID type. The repeated dialing operation is troublesome. In another type of the composite facsimile apparatus called one touch key type, one key is provided for each address so that when a given key is depressed a corresponding address can be designated. With this type of apparatus, however, an operator is also required to manipulate the apparatus each time a telegram is sent.

SUMMARY OF THE INVENTION

Accordingly, it is an object of this invention to provide improved composite facsimile apparatus in which several addresses can be readily designated when the same composition is transmitted to a number of different addresses without relying upon any special operation of the operator.

Briefly stated, according to this invention, a dial information character code that designates an address is included in an input character code so the input character code or a picture code corresponding thereto is transmitted to an address corresponding to the dial information character code.

According to this invention, there is provided composite facsimile apparatus connected to a data terminal unit processor to transmit and receive either one of a character code and a picture signal through a transmission line. The apparatus comprises detecting means for detecting a predetermined designation character code that designates a dial information character code reresenting a dial information among the character codes representing a telegram sent out from the data terminal unit; dial information output means which, in response to the detection operation of the detecting means, extracts the dial information character code following the designation character code so as to form and output a corresponding dial information based on the dial information character code; dial signal output means for outputting a dial signal when receiving the dial information; and transmission control means for transmitting one of the character code or a picture code corresponding thereto sent out from the data terminal circuit to a remote facsimile apparatus corresponding to the dial signal.

As described above according to this invention, since dial information of an addressed remote information is included in the character code, it is possible to transmit a telegram to the addressed facsimile apparatus without operator activity each time transmission of a telegram or a document is completed. Accordingly, the operation can be simplified so that the facsimile apparatus of this invention is advantageous where the same telegram is transmitted to a plurality of remote facsimile apparatus. Moreover, by storing the telegram in a character output device, a record can be obtained showing addressed remote facsimile apparatus.

BRIEF DESCRIPTION OF THE DRAWINGS

In the accompanying drawings:

FIGS. 4A and 4B show flow charts useful to explain the operation of the embodiment shown in FIG. 1.

DESCRIPTION OF THE PREFERRED EMBODIMENT

Figure 1:
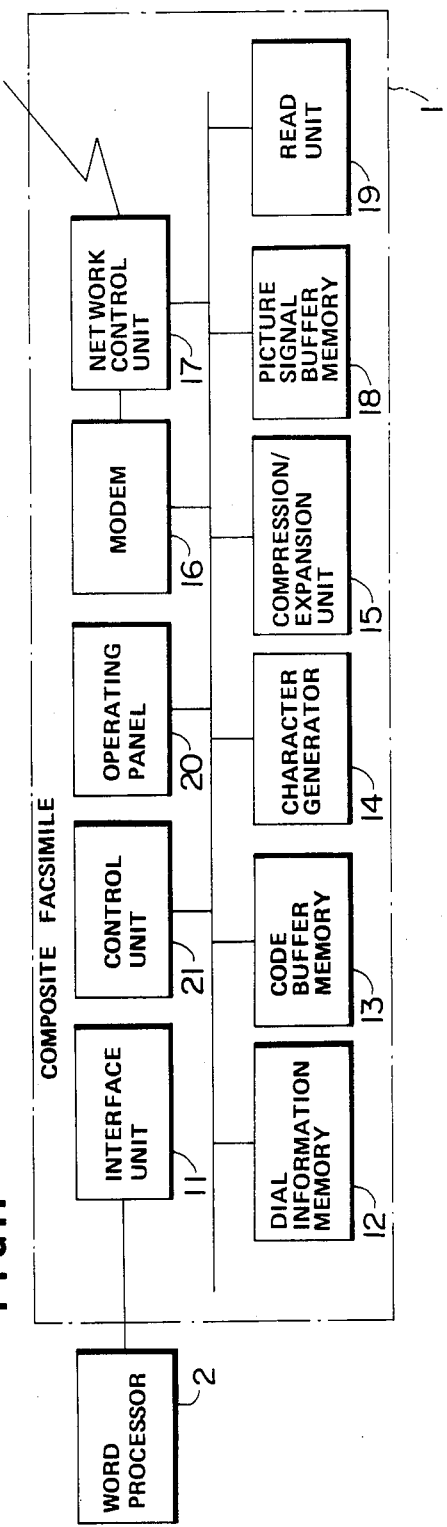
FIG. 1 is a block diagram showing a preferred embodiment of this invention.

In FIG. 1, a composite facsimile apparatus 1 embodying the invention is connected to a word processor 2. The facsimile apparatus shown in FIG. 1 comprises an interface 11 connected to receive a character code outputted from the word processor 2 and a dial information memory device 12 for storing dial information and sending out a dial signal. Facsimile apparatus 1 also includes a code buffer memory for storing a character code sent from the word processor 2 or a remote facsimile apparatus, a character generator 14 for converting the character code into a picture, a compression/expansion unit 15 which compresses and expands a picture signal, and a modulator/demodulator 16 effecting modulation and demodulation of a signal. In apparatus 1 network control unit 17 starts and restores an exchange network, a picture signal buffer memory 18 stores a picture signal, and a read unit 19 photoelectrically converts an input manuscript. Apparatus 1 also includes an operating panel 20 with which an operator inputs various instructions and data, and a control unit for controlling various circuit elements.

Figure 2:
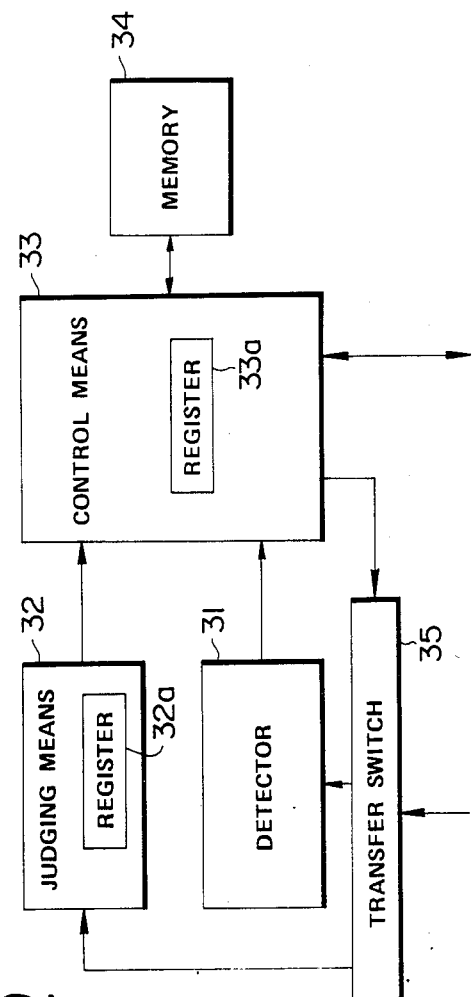
FIG. 2 is a block diagram showing a microcomputer utilized in FIG. 1.
Figure 3:
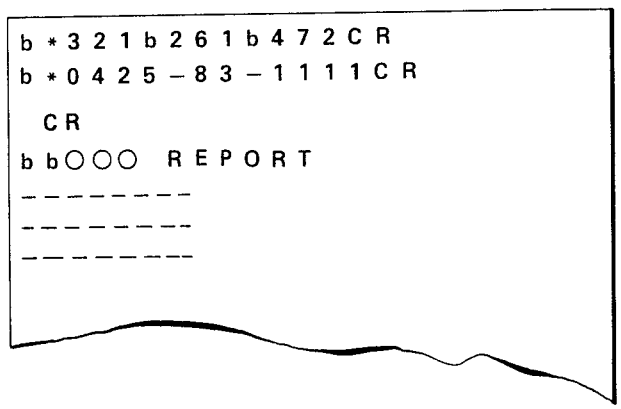
FIG. 3 is a chart showing an input telegram.

In the embodiment of the invention shown in FIG. 1, the control unit 21 includes a microcomputer, the construction thereof being shown by a block diagram shown in FIG. 2. A detector 31 is provided for detecting a character code (designation character code) representing the presence of a predetermined dial information inputted character codes. Assume now that a telegram as shown in FIG. 3 is sent. Symbols * correspond to the character codes. Although in the following description, designation character corresponding to * are used, it should be understood that the invention is not limited to this example. Thus, any character code corresponding to a letter or mark can be used so long as the character code distinctly represents presence of a dial information.

In FIG. 3, the letter b designates a blank and CR a carriage return. In FIG. 2, 32 designates a judging means which judges whether one character code (dial information character code) following another character code which has been detected by a detector 31 is of an abbreviated type dial number or a direct type dial number. More particularly, three order digits ⌈321⌋, ⌈261⌋ and ⌈472⌋ following mark * represent an abbreviated type dial number, while ⌈0425-83-1111⌋ following * mark on the second row represents a direct type dial number. The judging means 32 judges whether the number of orders of the digits is of predetermined number or orders (in this example three orders) and judges whether the number of orders of those digits constitute a dial number.

Means 33 is provided for controlling various circuit elements shown for outputting a direct type dial number. More particularly, the control means 33 gives to the detector 31 and judging means starting and ending instructions and receives the results of the detection and judgment. The judging means 32a includes a register 32a having a predetermined capacity for storing a digit character code. The register 32a stores the character code to be judged and when this character code corresponds to a dial number, sends it to the control means 33.

Memory means 34 is provided with a memory table for storing a dial number of the direct type corresponding to the compressed type dial number. The memory means 34 is accessed by the control means 33 when the judging means 32 judges that the dial number is of the abbreviated type.

A transfer switch 35 is provided for supplying the character code to the detector 31 or to the judging means under the control of the control means 33. The control means 33 is not only accessable to the dial information memory device 12 and the code buffer memory device 13 but also sends to the network control unit 17 a dial information. The network control unit 17 contains a dial signal output means, not shown, which outputs a dial signal based on a given dial information of the direct type. The control means 33 includes a register 33a storing a previously outputted dial information, so that each time dial information is sent out, the dial information stored in the register 33a is compared with that dial information to be sent out next. The control means 33 thus sends out dial information only when the compared dial informations do not coincide with each other. In the construction shown in FIG. 2, judging means 32, control means 33 and memory means 34 constitute a dial information output means outputting a direct type dial information.

Figure 4A:
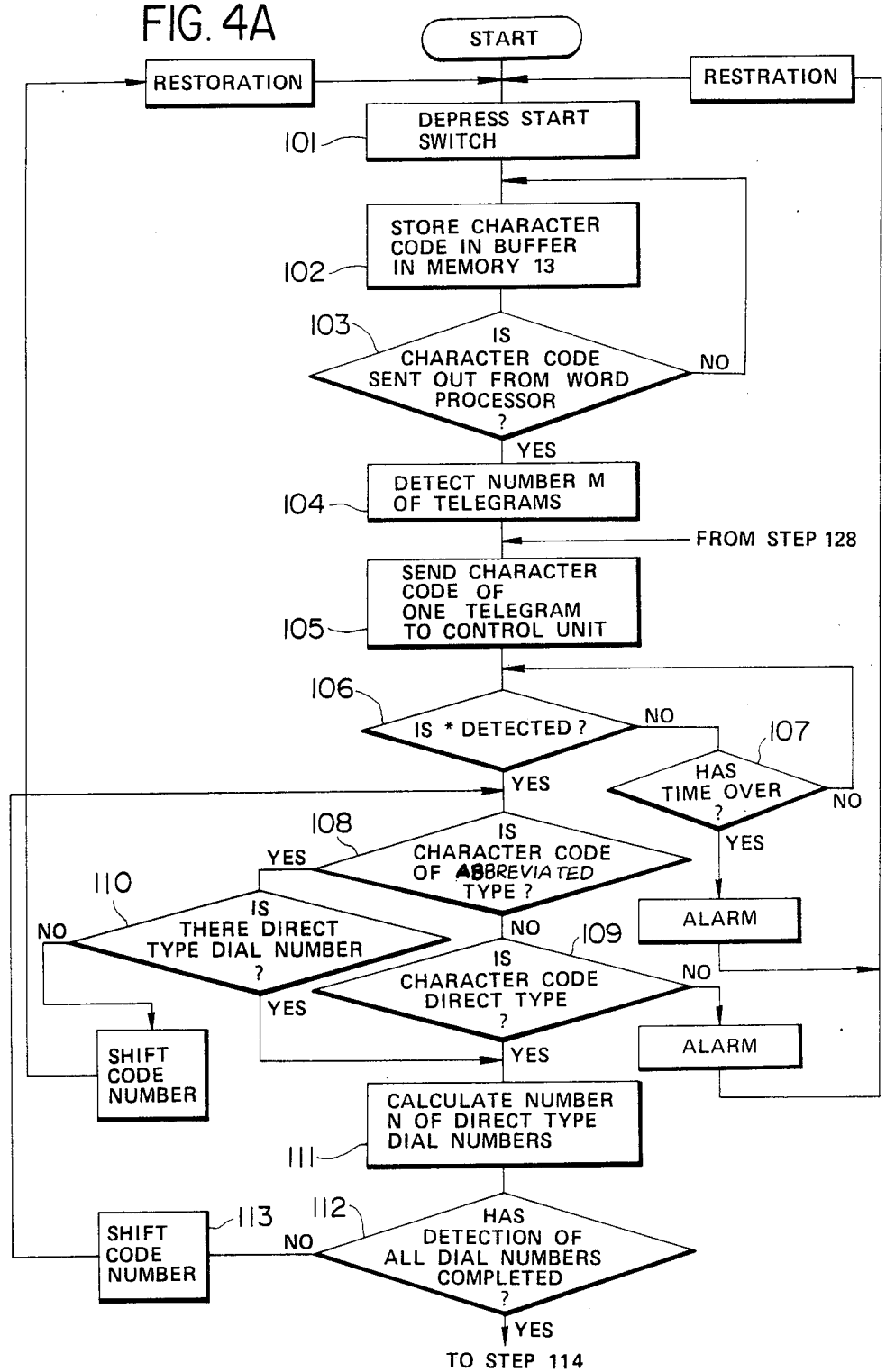

The operation of the composite facsimile apparatus described above will be described with reference to the flow charts shown in FIGS. 4A and 4B.

After closing a source switch, now shown, at step 101, in response to an input from the word processor 2, the operator depresses a start switch on an operating panel. Then, the facsimile apparatus will receive a character code corresponding to a telegram via interface 11. At step 102, the character code is stored in the code buffer memory 13 under the control of the control unit 21.

At step 103, the control unit 21 judges that whether there is a character code sent out from the word processor 2 or not. When there is no sent out character code, the result of judgment is YES. Then at step 104, the number of telegrams is determined from the data stored in the code buffer memory device 13. After that, at step 105, the character code of one telegram is sent to the control unit 21.

At step 106, based on this character code, the control unit 21 judges whether mark * is detected or not. Generally, the mark * may be positioned at any position of the telegram although it is preferable to position it at the beginning or end of the program. When the mark * is detected the control unit is permitted to read out the character code at a predetermined address. At this time, the control means 33 controls the transfer switch 35 to input the character code into the detector 31.

Assume now that a character code as shown in FIG. 8 is inputted to the detector. Mark * can be detected on the first line, and the detector 31 sends this fact to the control means 33. Even when several row character codes are searched, where no mark * is detected, at step 107 a judgment is made as to whether a predetermined time is over or not. When the result of judgment is YES, an alarm device is operated for requesting restration and the program is returned back to step 101.

Upon reception of detection, the control means 33 controls the transfer switch 35 to input the character code into the judging means 32. The judging means 32 checks whether the inputted character code (digits) continues over a predetermined number of orders (in the example shown in FIG. 3, 3 orders). As shown on the first line of FIG. 3, the digits ⌈321⌋, ⌈261⌋ and ⌈472⌋ are dial numbers of the abbreviated type each consisting of three orders. At step 108 a judgment is made whether the character code is of the abbreviated type or not. Where digits of more than 3 orders continue as shown on the second row of FIG. 3, the result of judgment at step 108 is NO, and at step 109 a judgment is made whether the number of orders is less than a predetermined number (to confirm that the number of orders is suitable for a telephone number). When the result of this judgment shows a dial number not of the direct type, that is NO, an alarm device is operated, and after restoration the program is returned to step 101.

When the result of judgment at step 108 is YES, the judging means 32 sends a signal showing that the dial number is of the abbreviated type and sends the dial number stored in the register 32a to the control means 33. Upon receipt of these informations, at step 110, the control means 33 reads out a corresponding dial number of the direct type from memory means 34. Where a plurality of dial numbers are stored in the memory means 34 corresponding to one abbreviated type dial number, the plurality of dial numbers are sequentially read out. Where the memory means does not store the corresponding direct type dial number, the result of judgment at step 110 becomes NO. Then an alarm device is actuated and after restoration the program is returned to step 101.

The number N of the direct type dial numbers sent from the judging means 32 or read out from the memory means 34 is calculated at step 111. Then at step 112, a judgment is made whether detection of all dial numbers has been completed, that is, whether all addresses have been accessed. When the result of this judgment is NO, at step 113, the code number is shifted and the program is returned to step 108 for the purpose of detecting a character code corresponding to the next dial number.

When the result of judgment executed at step 112 is YES, at step 114, the number N of all addresses is set. Then at step 115, unnecessary dial information is deleted from the telegram and a direct type dial number to be sent is stored in the register 33a of the control means as dial information to be sequentially sent out. Then at step 116, a judgment is made whether the dial information to be outputted coincides with the address of a telegram now being transmitted. This judgment is based upon the dial information, stored in the register 33a of the control means 33. When the result of judgment at step 116 is YES, it is judged that transmission of the telegram to an address corresponding to the dial information has been completed, so row signal processing is then executed without transmitting this dial information. On the other hand, if the result of judgment is NO, the dial information is sent to the network control unit 17. The dial signal output means of the network control unit 17 converts the received dial information into a dial signal which is sent out at step 117 shown in FIG. 4B.

When the remote facsimile apparatus responds, the control unit 21 is supplied from the network control unit 17 with data indicating that the remote facsimile apparatus has responded, and at step 118, the control unit 21 inquires the performance of the remote facsimile apparatus according to a negotiation transmission control procedure. At step 119, when it is judged that the remote facsimile apparatus has a performance that can receive the character code, the control unit 21 sequentially sends to modem 16 the telegram of the character code stored in the buffer memory device 13. After modulating the telegram, at steps 120 and 121, the control unit 21 sends the modulated telegram to the remote facsimile apparatus via the network control unit. At step 119, when it is judged that the remote facsimile apapratus can receive only a picture signal, the control unit 21 sends the character code in the code buffer memory 13 to the character generator 14 and sequentially converts the character code into a picture code. The picture code is sent to the compression/expansion unit 15 where it is compressed by being MH or MR encoded and the compressed picture signal is sent to the modem 16 at step 122. Then at step 123, the fact that a picture signal is transmitted is taught to the remote facsimile apparatus through the network control unit 19. Then at step 121, the compressed picture signal modulated by the modem 16 is sent to the remote facsimile apparatus through network control unit 17.

When transmission of a telegram to an address completes step 124, at step 125, the number of addresses N is changed to N−1 and at step 126, a judgment is made whether N=0. When the result of this judgment is NO, it means that an address to which the telegram is transmitted is remaining so that the program is returned to step 115 for transmitting the telegram to the next address. At step 126, when it is judged that N=0, the transmission of the telegram is complete.

For example, the telegram shown in FIG. 3 is sequentially sent to addresses of dial numbers shown by abbreviated type of ⌈321⌋, ⌈261⌋ and ⌈472⌋ and to the address of a direct type dial number shown by ⌈0425-83-1111⌋. The dial number assigned to one telegram may be one or more. Although the telegram shown in FIG. 3 comprises a mixture of an abbreviated type dial number and a direct type dial number, any one of the numbers may be used. Where an abbreviated dial number is set to correspond to a plurality of addresses, the transmission control is made such that one abbreviated dial number can be transmitted to a plurality of addresses.

When the result of judgment at step 126 is YES, at step 127 the number M of the telegrams to be transmitted is changed to M−1. Then at step 128, a judgment is made whether M=0. Where M≠0, it means that other telegrams to be transmitted are remaining so that the program is returned to step 105 to execute transmission processing of the next telegram.

When all telegrams are transmitted, i.e. when it is judged that M=0 at step 128, it is then judged that transmission of all telegrams has been completed.

Figure 5:
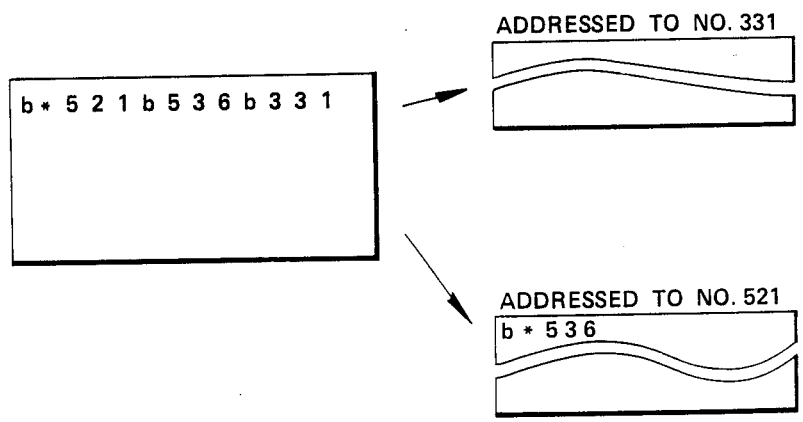
FIGS. 5, 6, and 7 are charts showing examples of original and received telegram.

During transmission of the telegrams, the dial information contained therein may be transmitted as is or the telegrams can be transmitted after removing the dial information. Deletion of the dial information is executed at step 115.

Where the remote facsimile apparatus is instructed to transfer the informations to another apparatus, the information is transmitted to the remote facsimile apparatus together with the address to which the information is to be transferred. For example, as shown in FIG. 5, where a document is to be transmitted to remote apparatus presented by the abbreviated dial numbers ⌈521⌋, ⌈536⌋ and ⌈331⌋, and where information is to be transmitted to apparatus at the number ⌈536⌋ from apparatus at the number ⌈521⌋, the document is transmitted to remote apparatus at the number ⌈331⌋ after removing the dial information from the document. To remote apparatus at number ⌈521⌋, on the other hand the document is transmitted without removing the dial information representing the number ⌈536⌋ of the apparatus to which the document should be transferred. In this case, at step 117, such a transfer occurs by dialing operation corresponding to number ⌈536⌋ is not executed. Thus, the document is not transmitted directly to the remote apparatus of number ⌈536⌋. When number ⌈521⌋ remote apparatus receives a telegram added with a transfer address number ⌈536⌋, the transfer of the document to number ⌈536⌋ apparatus is made.

Figure 6:
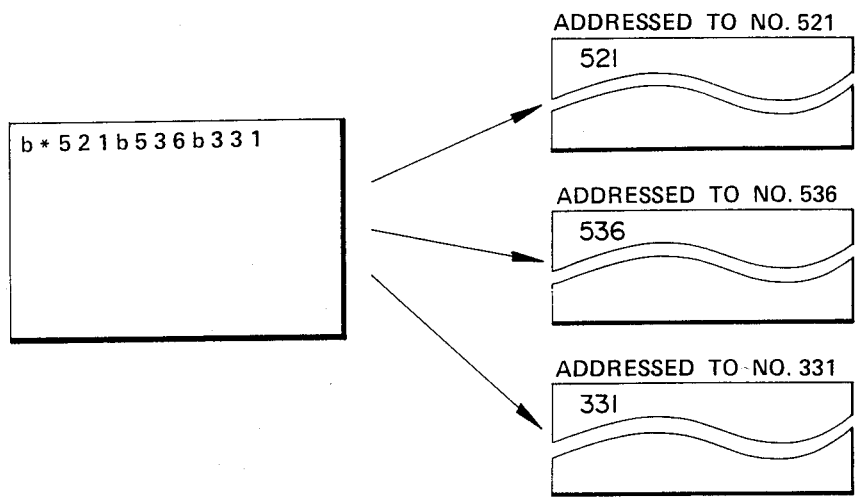

The program can be prepared such that the telegram is transmitted to the remote facsimile apparatus leaving in the telegram only the dial information of the remote apparatus to which the document is to be transferred at step 115. FIG. 6 shows one example of a telegram constructed as above described in which to the remote apparatus of the number ⌈521⌋, ⌈536⌋ and ⌈331⌋ are transmitted the telegrams without deleting numbers ⌈521⌋, ⌈536⌋ and ⌈331⌋, that is the dial informations. With this construction, the addressed apparatus can confirm that the received telegram is addressed to it.

It is also possible to transmit a telegram to a remote apparatus without deleting the dial information and to transmit to a remote apparatus the telegram by designating a dial information corresponding to the remote apparatus with a predetermined mark.

Figure 7:
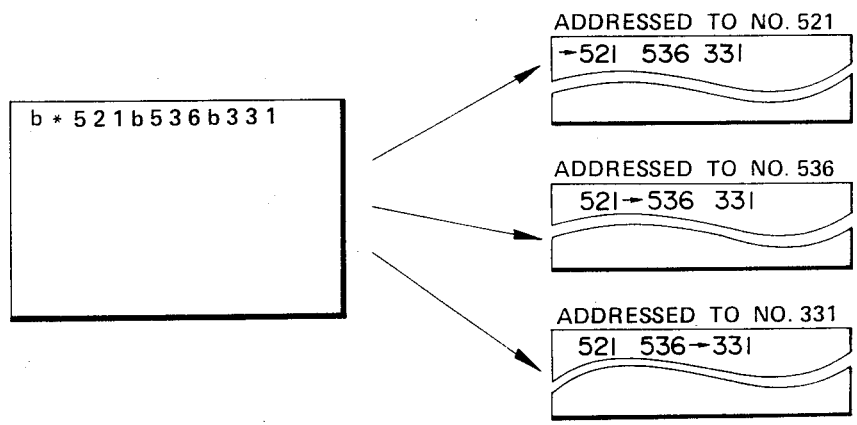

FIG. 7 shows one example of a telegram constructed as above described in which arrows are added to number ⌈521⌋ for a remote apparatus of number ⌈521⌋, to number ⌈536⌋ for a remote apparatus number ⌈536⌋ and number ⌈351⌋ for a remote apparatus at number ⌈331⌋. With this construction the remote apparatus receiving the telegram not only can confirm that the telegram is addressed thereto but also can know that the same telegram is sent to other apparatus.

What is claimed is:

1. In a composite facsimile apparatus connected to a data terminal unit processing so as to transmit and receive either one of a character code and a picture signal through a transmission line, the improvement comprising:
    means for detecting from a plurality of character codes representing a message sent from said data terminal unit, a predetermined designation character code that designates a dial information character code representing dial information;

dial information output means, responding to said detecting means, for forming said dial information character code from said predetermined designation character code and for forming and outputting corresponding dial information based on said dial information character code;

dial signal output means for outputting a dial signal in response to said dial information; and transmission control means for transmitting either one of the character code and picture code from said data terminal unit to a remote facsimile apparatus corresponding to said dial signal.

2. The composite facsimile apparatus according to claim 1 wherein said dial information output means comprises
- means for judging whether said dial information character code corresponds to one of a plurality of stored abbreviated type dial numbers or to a direct type dial number,
- memory means, for storing said plurality of abbreviated type dial numbers and corresponding direct type dial numbers, and
- control means for forming, from said memory table, said dial information to be outputted corresponding to one of said direct type dial number in turn corresponding to said dial information character code.

3. The composite facsimile apparatus according to claim 2 wherein said control means comprises
- means for judging whether said outputted dial information corresponds to the same remote facsimile apparatus to which a telegram was most recently transmitted, and means for preventing the output of said dial information when said dial information is for said same remote facsimile apparatus and for permitting the output of said dial information when said dial information is not for said same remote apparatus.

4. The composite type facsimile apparatus according to claim 2 wherein said control means includes means for sequentially outputting dial information for each said direct type dial number corresponding to said dial information character codes in said telegram.

5. The composite facsimile apparatus according to claim 1
- wherein said dial information output means comprises means for outputting only said dial information for said remote facsimile apparatus corresponding to said dial signal, and
- wherein said transmission control means includes means for transmitting a character code exclusive of dial information character code corresponding to dial information outputted from said dial information outputting means.

6. The composite facsimile apparatus according to claim 1
- wherein said dial information output means comprises means for removing from a character code all dial information character codes other than said dial information code corresponding to said remote facsimile apparatus, and
- wherein said transmission control means comprises means for transmitting a character code exclusive of dial information character codes other than said dial information character code corresponding to said remote facsimile apparatus corresponding in turn to said data signal.

7. The composite facsimile apparatus according to claim 1 wherein said tranmission control means comprises means for transmitting to said remote facsimile apparatus corresponding to said data signal a character code accompanied by a predetermined mark.

* * * * *